(No Model.)

J. B. SPOONER.
CAPSTAN.

No. 357,871.  Patented Feb. 15, 1887.

WITNESSES
F. E. Gaither
A. L. Morsell

INVENTOR
Joseph B. Spooner
By Louis Bagger and Co.,
Attorneys

UNITED STATES PATENT OFFICE.

JOSEPH B. SPOONER, OF OREANA, ILLINOIS.

CAPSTAN.

SPECIFICATION forming part of Letters Patent No. 357,871, dated February 15, 1887.

Application filed September 10, 1886. Serial No. 213,224. (No model.)

*To all whom it may concern:*

Be it known that I, JOSEPH B. SPOONER, of Oreana, in the county of Macon and State of Illinois, have invented certain new and useful Improvements in Capstans; and I do hereby declare that the following is a full, clear, and exact description of the invention, which will enable others skilled in the art to which it appertains to make and use the same, reference being had to the accompanying drawings, which form a part of this specification, and in which—

Figure 1:
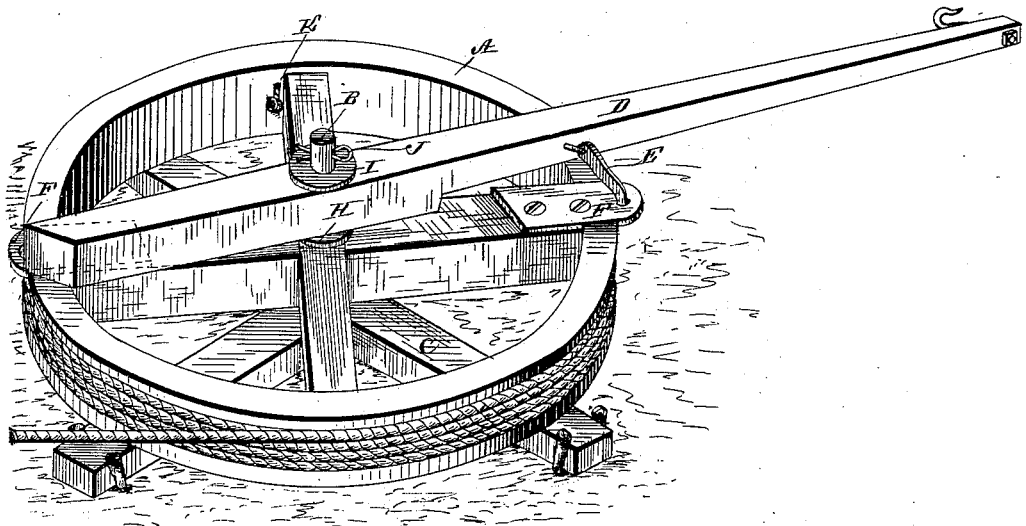
Figure 2:
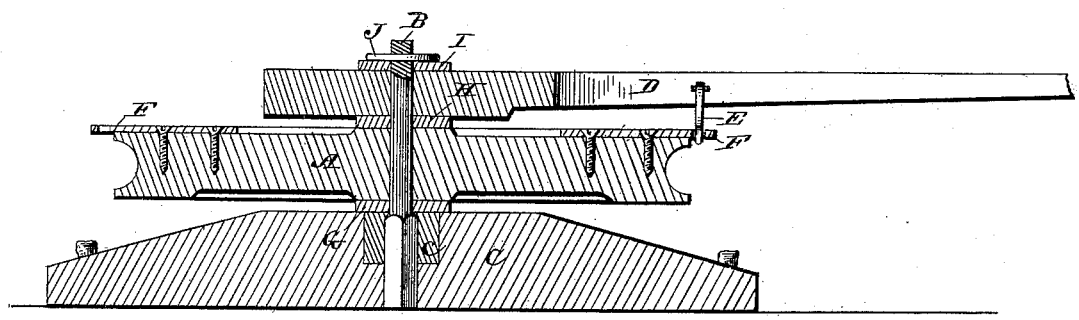

Figure 1 is a perspective view of my improved capstan, and Fig. 2 is a vertical central section of the same.

Like letters of reference indicate corresponding parts in the figures.

My invention has relation to capstans used in hoisting hay, coal, well-buckets, and the like; and it consists in the improved construction and combination of parts constituting the same, as will be hereinafter fully set forth.

The object of my invention is to provide a horse-power capstan, such that when the thing to be hoisted has reached the desired position the team may be stopped and the drum released from its connection with the sweep, thus allowing the team to stand still while the rope unwinds from said drum.

This object is accomplished, as illustrated in the accompanying drawings, by journaling a grooved wheel or drum, A, upon a vertical stud, B, which is secured in the center of a bed-frame, C, and then pivoting to said stud above the wheel a sweep, D, which is provided with a hook, E, on one edge for engaging flat staples F, projecting from the rim of said wheel. Between the wheel and the bed-frame is placed a washer, G, and between the wheel and sweep a washer, H. Then upon the stud above the sweep is placed a washer, I, and through the stud above said washer is passed a key, J. The inner end of the sweep is thicker than the outer end, and is extended sufficiently far to balance said sweep upon the stud. The flat staples are let into the wheel so as to render their surfaces flush with the surface of the wheel. The hoisting-rope is made fast to the rim of the wheel in any ordinary way, being shown in the drawings as having its end passed through a hole in said rim and knotted, as seen at K. The other end of the rope passes, in the usual manner, through direction-changing pulleys to the thing to be hoisted.

In operating this capstan a team or one horse is hitched to the sweep, the hook E placed in one of the staples F, and the wheel revolved, as indicated by the arrow, until the hoisting is completed. Then the hook is removed from the staple, which allows the wheel to revolve freely till the necessary amount of rope is unwound, the horse meanwhile remaining standing. When it is desired to start the wheel again, the hook is placed in the staple which is nearest it, and the horse started.

This capstan may be used in hoisting hay or by builders in hoisting brick and mortar. It may also be used for many other purposes for which hoisting-capstans are employed.

Having thus fully described my invention, I claim—

In a capstan, the combination of a frame having an upwardly-extending stud rigidly secured at its center, the ends of said frame being adapted to be secured to the ground by means of stakes, a wheel and a sweep journaled upon said stud, flat staples secured in the top of the wheel flush with its surface, a hook upon the sweep, and washers upon the stud between the frame, wheel, and sweep.

In testimony that I claim the foregoing as my own I have hereunto affixed my signature in presence of two witnesses.

JOSEPH B. SPOONER.

Witnesses:
AUGUSTUS W. HARDY,
J. R. MOSSER.